S. L. GEDNEY.
COLLAR FASTENER.
APPLICATION FILED JULY 16, 1920.
1,374,007.
Patented Apr. 5, 1921.
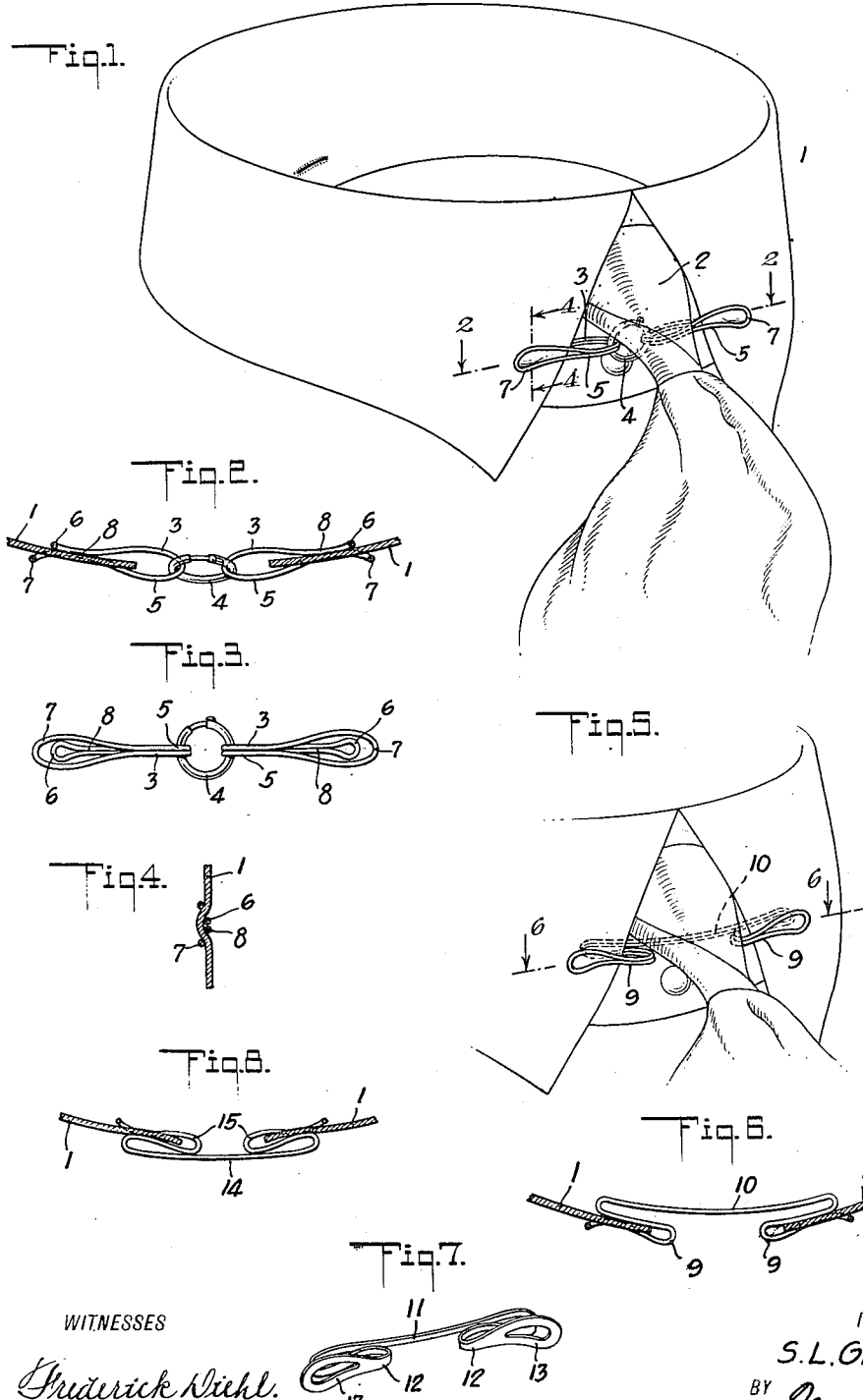
WITNESSES
Frederick Diehl.
S. W. Foster
INVENTOR
S. L. GEDNEY
BY
ATTORNEYS

UNITED STATES PATENT OFFICE.

STANLEY L. GEDNEY, OF MAPLEWOOD, NEW JERSEY.

COLLAR-FASTENER.

1,374,007.  Specification of Letters Patent.  Patented Apr. 5, 1921.

Application filed July 16, 1920. Serial No. 396,653.

*To all whom it may concern:*

Be it known that I, STANLEY L. GEDNEY, a citizen of the United States, and a resident of Maplewood, in the county of Essex and State of New Jersey, have invented a new and Improved Collar-Fastener, of which the following is a full, clear, and exact description.

This invention relates to improvements in collar fasteners, and more particularly to a fastener or holding device for soft collars, an object of the invention being to provide a collar fastener which can be readily attached to the flaps or sections of a collar, which will hold the collar in proper position and which will not accidentally slip or move either vertically or longitudinally.

A further object is to construct a collar fastener having improved clamps at its ends which, when in position, have a bite or clamping indentation in the collar to prevent accidental movement of the fastener in any direction.

A further object is to provide a collar fastener which will be of extremely neat and ornamental appearance, which can be easily attached or detached, and which, when in position, will supply an ornamental adjunct to the collar and at the same time maintain the collar in proper position.

With these and other objects in view the invention consists in certain novel features of construction, and combinations and arrangments of parts as will be more fully hereinafter described and pointed out in the claims.

In the accompanying drawings—

Figure 1 is a perspective view illustrating one form of my invention in position on a collar.

Fig. 2 is a view in section on the line 2—2 of Fig. 1.

Fig. 3 is a view in elevation of the collar fastener removed.

Fig. 4 is an exaggerated view in section on the line 4—4 of Fig. 1.

Fig. 5 is a perspective view illustrating a modified form of fastener in position on a collar.

Fig. 6 is a view in section on the line 6—6 of Fig. 5.

Fig. 7 is a perspective view of a modified form of collar fastener.

Fig. 8 is a view similar to Fig. 6 illustrating another modified form of collar fastener, Referring particularly to Figs. 1, 2, 3 and 4, 1 represents a turned-over collar of the ordinary soft type and 2 is a necktie positioned therein. In the form of my invention illustrated in Figs. 1, 2, 3 and 4, my improved fastener comprises three parts, namely, a pair of spring clamps 3, 3, and a connecting ring or link 4. The spring clamps 3 are each composed of a double run of a single piece of wire and as these clamps are constructed precisely alike the description hereinafter of one will apply alike to both.

The intermediate portion of the clamp is bowed as shown at 5 forming a pair of jaws 6 and 7. The runs of wire forming the jaw 7 are spread apart so that the jaw 7 at its free end is in the form of a loop and is of general compound curvature. The other jaw 6 is also made of general compound curvature so that a portion 8 thereof adjacent its free end extends normally in a plane within the two runs of wire forming the loop or jaw 7 so that the collar 1, when engaged by the clamp, is forced within the loop or jaw 7 and a secure bite is had on the collar preventing movement of the clamp on the collar either vertically or horizontally. Hence, when the clamp is positioned on the collar, it will remain where placed and will not accidentally slip as is so common with devices of a similar nature in general use. In other words, I provide a pair of collar engaging clamps, both of which consist of two clamping jaws, one jaw being in the form of a loop and the other jaw spring pressed within the loop so as to force the material of the collar within the loop when the clamp is in engaging position thereon.

The free ends of the jaws 6 and 7 are flared outwardly or apart and ornamented or shaped at their free ends in any approved manner to provide a free entrance for the collar into the clamp.

The link or ring 4 is preferably in the form of a snap ring as shown, so that it can be freely coupled to one or both of the clamps, but, of course, the invention is not limited to a snap ring, but I may employ any form of ring, link or links desired.

In Fig. 4, I illustrate clearly the clamping or biting action of the jaws when in engagement with the collar, and it is this broad feature of my invention which enables my device to maintain itself in position on the collar and hold the parts as desired, In operation, the clamps 3, 3, may be positioned on the sections of the collar before the latter is buttoned onto the shirt and then the ring or link 4 used to couple the clamps together, or, if desired, the collar may be first positioned on the shirt and then the fastening device as an entirety placed on the collar as is customary with devices as formerly made.

In Figs. 5 and 6, I illustrate a modification in which the pair of clamps 9, 9, corresponding to the clamps 3 of the preferred form, are made integral with a bar 10, the latter being curved or bowed outwardly as clearly shown in Fig. 6, so as to conform to the general curvature of the collar. In this modified form of my invention I employ a double run of a single wire to form the entire fastener and construct the clamps precisely as above described in connection with the preferred form to secure the necessary grip or bite in the collar to prevent accidental movement of the fastener when in use.

In Fig. 7, I illustrate a modification in which I construct the fastener 11 of the same shape as that shown in Fig. 5 except that the device is made of a strip of sheet metal instead of wire and to provide the desired bite or grip, the clamps 12, 12, corresponding to the clamps 3, 3, of the preferred form, have one jaw provided with slots or openings 13 forming the end of the jaw into a loop similar to that formed by the wire and with this construction I obtain the same biting above described.

In Fig. 8 I illustrate a modification in which the fastener is made of wire and is similar to the fastener shown in Figs. 5 and 6, except that the bar 14 connecting the clamps 15 is at the outer portion of the clamps and bowed outwardly instead of the reverse of this structure as indicated in Figs. 5 and 6.

While I have illustrated and described a number of different forms of my invention, it is obvious that other slight changes might be made in the general shape and form thereof without departing from my invention. I do not wish, therefore, to be limited to the precise shapes illustrated but consider myself entitled broadly to the idea of a fastening device for collars in which clamps are provided having each a pair of jaws, one of which is normally within the plane of the other so as to press the material of the collar within one of the jaws and secure a bite or gripping action to prevent slipping or accidental movement of the clamp or clamps in any direction.

Various other slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A connected collar fastener, comprising a pair of collar engaging spring clamps, said fastener composed of wire, and the clamps consisting each of a pair of jaws having their free ends flared apart, one of said jaws constituting a loop and the other of said jaws normally positioned within the loop.

2. A collar fastener, comprising a pair of collar engaging spring clamps, said fastener composed of wire, and the clamps consisting each of a pair of jaws having their free ends flared apart, one of said jaws constituting a loop and the other of said jaws normally positioned within the loop, and a coupling member connecting the clamps.

3. A collar fastener, comprising a pair of collar engaging spring clamps, each clamp composed of a double run of a single wire and forming a pair of jaws having their free ends flared apart, one of said jaws constituting a loop and the other of said jaws normally positioned within the loop, and a snap ring separably connecting the clamps.

STANLEY L. GEDNEY.